US012761046B2

(12) United States Patent
Chavez Cortes et al.

(10) Patent No.: US 12,761,046 B2
(45) Date of Patent: Oct. 13, 2026

(54) SYSTEM AND METHOD FOR MAPPING AND ROUTING FOR ROBOTIC LAST-MILE DELIVERY INFRASTRUCTURE

(71) Applicants: Andrés Felipe Chavez Cortes, El Cerrito, CA (US); John Alberto Betancourt Gonzalez, Bogota (CO); Alejandro Naranjo, Cali (CO); Pedro Gonzalez, Medellín (CO)

(72) Inventors: Andrés Felipe Chavez Cortes, El Cerrito, CA (US); John Alberto Betancourt Gonzalez, Bogota (CO); Alejandro Naranjo, Cali (CO); Pedro Gonzalez, Medellín (CO)

( * ) Notice: Subject to any disclaimer, the term of this patent is extended or adjusted under 35 U.S.C. 154(b) by 0 days.

(21) Appl. No.: 18/546,000

(22) Filed: Dec. 19, 2023

(65) Prior Publication Data

US 2024/0219200 A1 Jul. 4, 2024

Related U.S. Application Data

(60) Provisional application No. 63/477,927, filed on Dec. 30, 2022.

(51) Int. Cl.

| | |
|---|---|
| ***G01C 21/00*** | (2006.01) |
| ***G01C 21/34*** | (2006.01) |
| ***G06F 16/29*** | (2019.01) |
| ***G06Q 10/083*** | (2024.01) |

(52) U.S. Cl.

CPC ......... *G01C 21/3848* (2020.08); *G01C 21/34* (2013.01); *G06F 16/29* (2019.01); *G06Q 10/08355* (2013.01)

(58) Field of Classification Search

CPC ..... G01C 21/3848; G01C 21/34; G06F 16/29; G06Q 10/08355

See application file for complete search history.

(56) References Cited

U.S. PATENT DOCUMENTS

| | | | | |
|---|---|---|---|---|
| 10,402,723 | B1 * | 9/2019 | Silberman | G06N 3/006 |
| 2021/0358206 | A1 * | 11/2021 | Song | G01C 21/005 |
| 2022/0024486 | A1 * | 1/2022 | Scott | B60W 60/0025 |
| 2023/0186083 | A1 * | 6/2023 | Silberman | G06N 3/044 706/12 |
| 2023/0419467 | A1 * | 12/2023 | Rice | B25J 11/00 |
| 2024/0168487 | A1 * | 5/2024 | Pegg | G05D 1/0274 |
| 2025/0095488 | A1 * | 3/2025 | Sun | G08G 1/14 |

* cited by examiner

*Primary Examiner* — Russell Frejd

(74) *Attorney, Agent, or Firm* — FisherBroyles, LLP; James P. Cleary

(57) ABSTRACT

A system and method for mapping and routing robotic pathways, utilizing a mobile robot having data gathering capabilities and a method for gathering, calculating, analyzing, and processing data to generate robot accessible traversable maps. The data gathering module, comprising a plurality of sensors, utilizes a mapping software to collect a series of nodes and paths between said nodes, recording pertinent data regarding said nodes and pathways. The process iterates until a comprehensive map is generated composed of a plurality of nodes and pathways. Once generated, the comprehensive map is saved, either locally or onto a cloud network.

12 Claims, 34 Drawing Sheets

24

24a

SYSTEM AND METHOD FOR MAPPING AND ROUTING FOR ROBOTIC LAST-MILE DELIVERY INFRASTRUCTURE

FIELD OF THE INVENTION

The present invention relates generally to a method of mapping and routing pathways. More specifically, the present invention is a system and method for mapping and routing paths for a last mile robotic delivery infrastructure.

BACKGROUND OF THE INVENTION

One of the major challenges facing last mile delivery for robotic delivery systems is knowing the precise location of a robot on a map. The exact location is crucial in determining how the robot can safely navigate between two given points, thus having the exact location will make it possible to know the relative position of the robot in regard to a reference frame, allowing the robot to correctly navigate.

Additionally, when granted an established map, the robot is also inherently given an infinite number of possible routes to take in getting from one point to another. With that being said, established maps do not provide the necessary information pertaining to mobility limitations that are required for last mile delivery robots to properly traverse once deployed. For example, vehicles and pedestrians may have the capabilities to traverse various obstacles that a robot cannot, however this information is typically not cited within established maps. It is necessary and optimal for the robot to know the limitations of the route and use those limitations to determine and analyze the most effective route to take given variables and criteria such as travel time, distance, and other related criteria. Thus, a routing system and method is sought to provide an optimal route for navigating last mile robot delivery systems.

Currently, there does not exist a mapping system, nor map database for that matter, that incorporates transit for autonomous mobile robots. Unlike its counterparts, mobile robots abide by a different set of rules than other entities when traversing pathways. Given these limitations, the present systems in place do not provide feasible traversable routes for robots in terms of navigation. Although there are mapping and routing systems that exist, these are limited to the aforementioned entities, and do not consider robots within their calculations and analyses.

The system disclosed herein seeks to overcome the shortcomings of the prior art by providing frameworks, algorithms, devices, and computer executed methods for mapping and routing last mile delivery routes for robotic systems. The present invention utilizes a robotic data gathering module to analyze, route, and indicate pertinent information relating to mapping according to the limitations of robotic mobility. The present invention seeks to provide a mapping framework considering navigational limitations of last mile delivery robotic systems by providing road-map integration, utilizing urban street data frameworks, addressing location concerns, and visualizing the maps and routes.

DETAIL DESCRIPTIONS OF THE INVENTION

Figure 1:
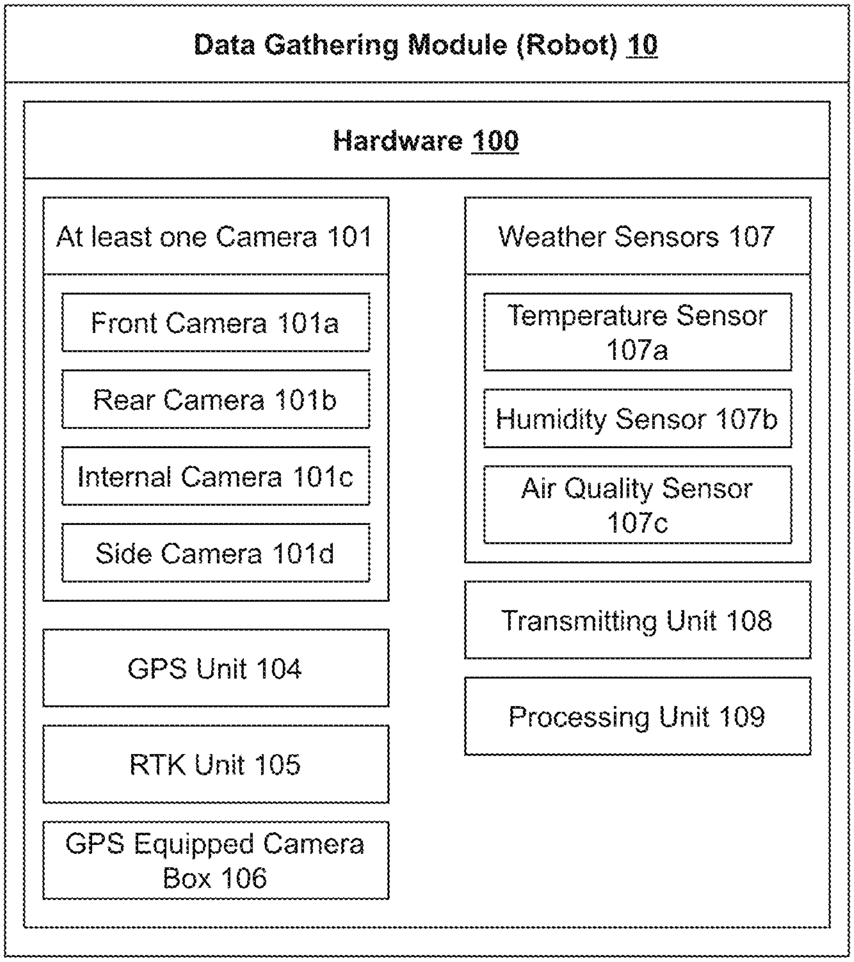
FIG. 1 is a diagram listing the components of the data gathering module of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a system and method of mapping and routing robotically navigable pathways and routes, embodiments of the present disclosure are not limited to use only in this context. Further, the present invention comprises a system for executing compute executable functions, methods, and processes whereby said functions, methods, and processes communicate via non-transitory form of signal transmission to map and route robotically navigable pathways and routes.

The present invention is a system and method of mapping and routing robotically navigable pathways and routes. In the context of the present invention, the term robotically navigable pathways and routes is defined as a way from one location to another, that is traversable by a mobile robotic system. In the preferred embodiment of the present invention, the mobile robotic system is intended to be utilized in robotic and autonomous last-mile delivery systems.

Figure 2:
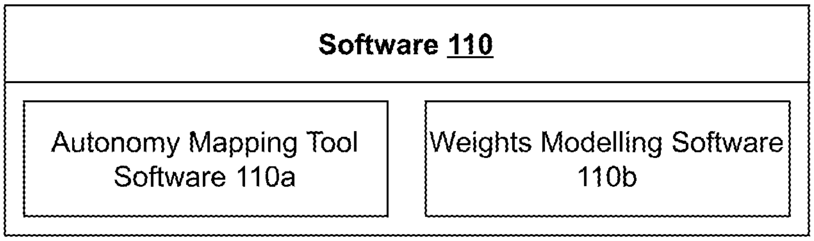
FIG. 2 is a diagram of the software of the present invention.

In the preferred embodiment of the present invention, as shown in FIG. 1, the system comprises a data gathering module wherein said data gathering module is a controllable mobile robot comprising at least one hardware 100, a processing unit 109, and a transmitting device 108. In the preferred embodiment of the present invention, the at least one hardware 100 is a device capable of receiving and gathering a sensory input, whereby said hardware 100 may comprise at least one of an at least one camera 101 including a front camera 101*a*, a rear camera 101*b*, an internal camera 101*c*, a side camera 101*d*; a global positioning system (GPS) unit 104; a real-time kinematic position (RTK) unit 105; a GPS equipped camera box 106; and an at least one weather and environment sensor 107; and a combination thereof. In some embodiments, the at least one weather and environment sensor 107 comprises one of a temperature sensor 107*a*, a humidity sensor 107*b*, an air quality sensor 107*c*, and a combination thereof. Furthermore, the processing unit 109 of the data gathering module robot 10 is capable of executing computer programmable methods such as software, as shown in FIG. 2. Furthermore, the transmitting device 108 is capable of sending and receiving information and data, to and from the data gathering module robot 10 to external devices wherein said external device may communicate functions for the robot to perform.

As shown in FIG. 2, the present invention further comprises software 110 wherein said software 110 comprises an autonomy mapping tool software 110*a* and a weight modeling tool software 110*b*. In the context of the present invention, the autonomy mapping tool software 110*a* is a computer executable method capable of gathering, utilizing, processing, and manipulating geographic data including map data. Likewise, as shown in FIG. 2, the weighted modeling tool 110*b*, within the context of the present invention is a computer executable method capable of parameterizing variables collected in discrete values and computing weighted scores given said variables and values.

Figure 3:
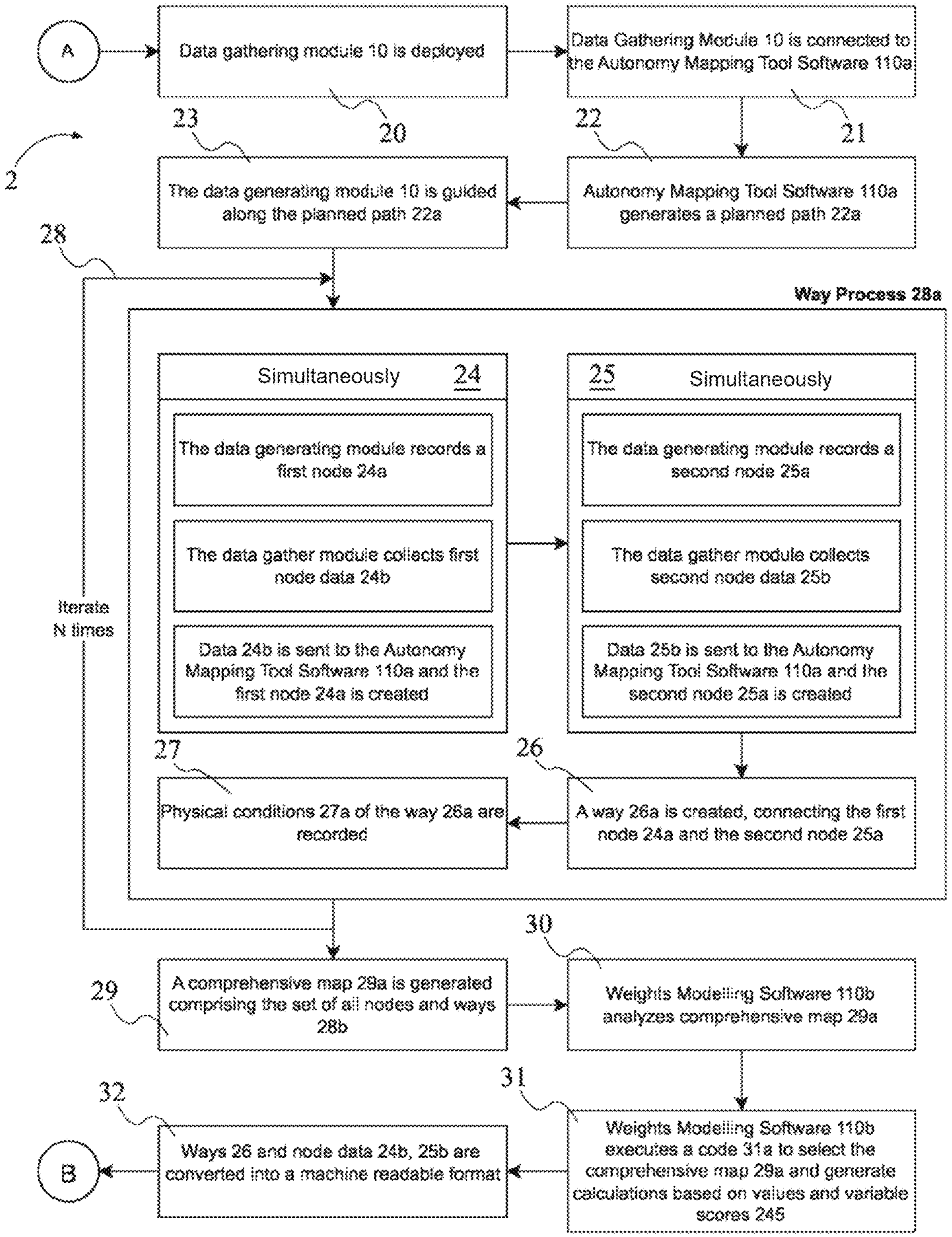
FIG. 3 is a process diagram of the present invention.

As shown in FIG. 3, in some embodiments of the present invention, the method 2 of the present invention comprises a step wherein the data gathering module is deployed 20 into a target location. Within the context of the present invention, the target location is a predetermined location wherein a user intends to map. Once deployed to the target location, the data gathering module is connected 21 to the autonomy mapping tool software 110*a* wherein the autonomy mapping tool software 110*a* generates 22 a predetermined path for the data gathering module robot 10 to follow and communicates said path to the data gathering module robot 10. After generating 22 the predetermined path 22*a*, the data gathering module robot 10 traverses 23 along the predetermined path 22*a*. In some embodiments of the present invention, the user may control and guide the data gathering module 10 along the predetermined path 22*a*.

Figure 4:
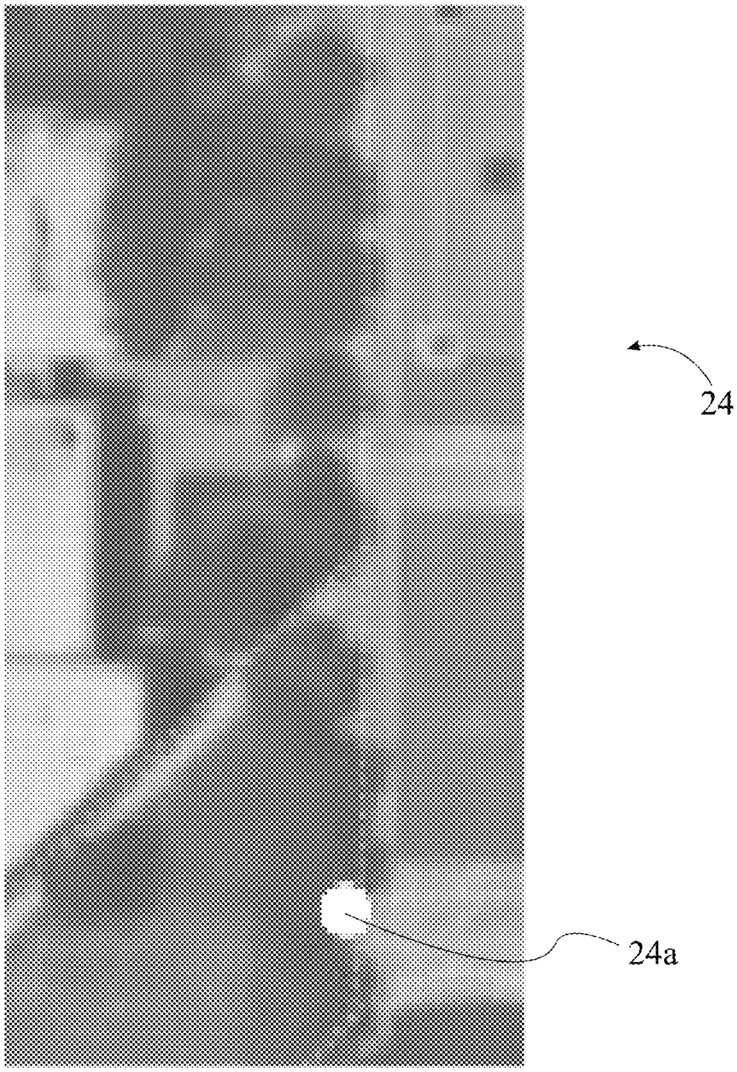
FIG. 4 is a picture of a first node plotted onto a map interface of the present invention.
Figure 5:
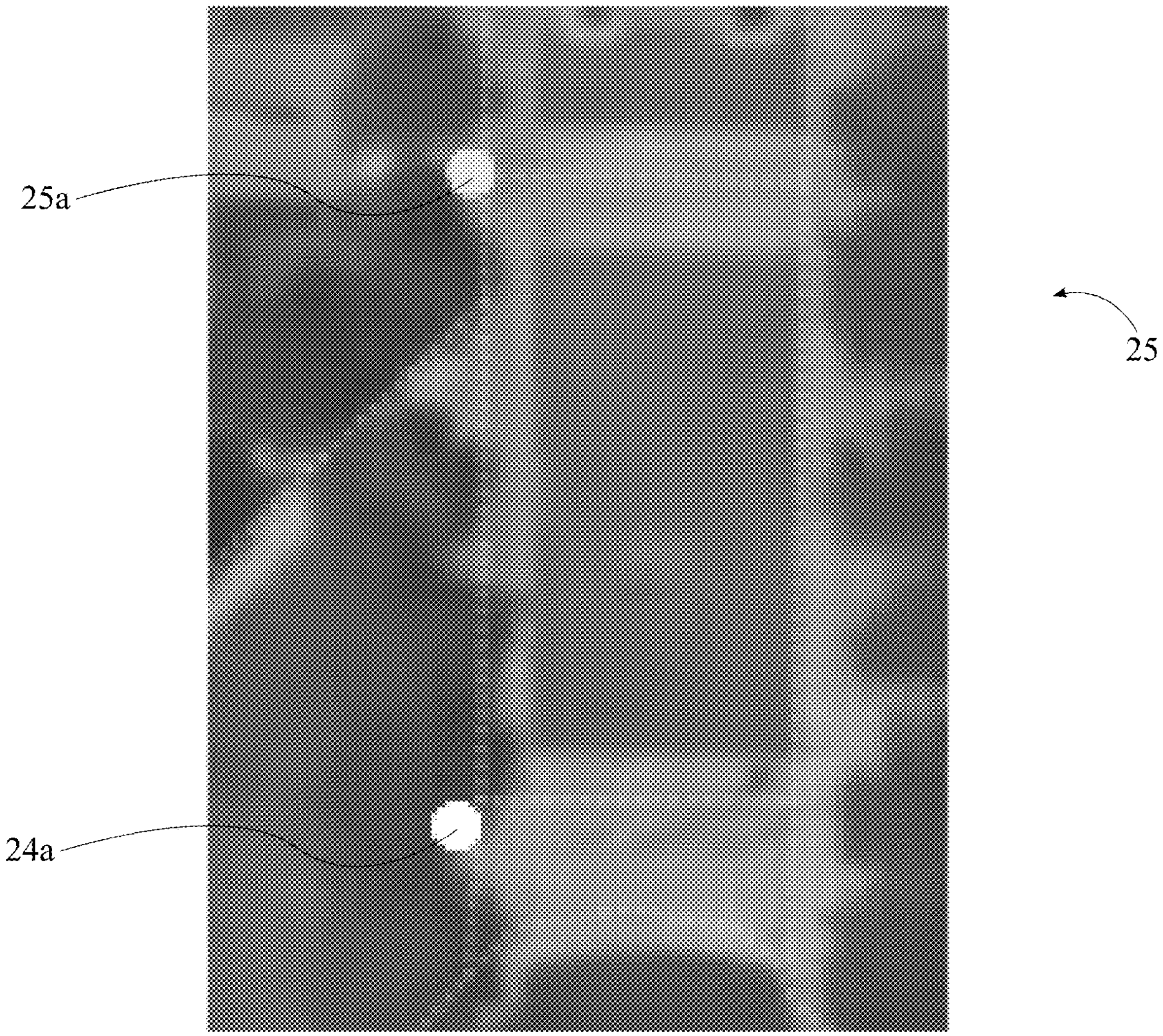
FIG. 5 is a picture of the first node and a second subsequent node plotted on the map interface of the present invention.
Figure 6:
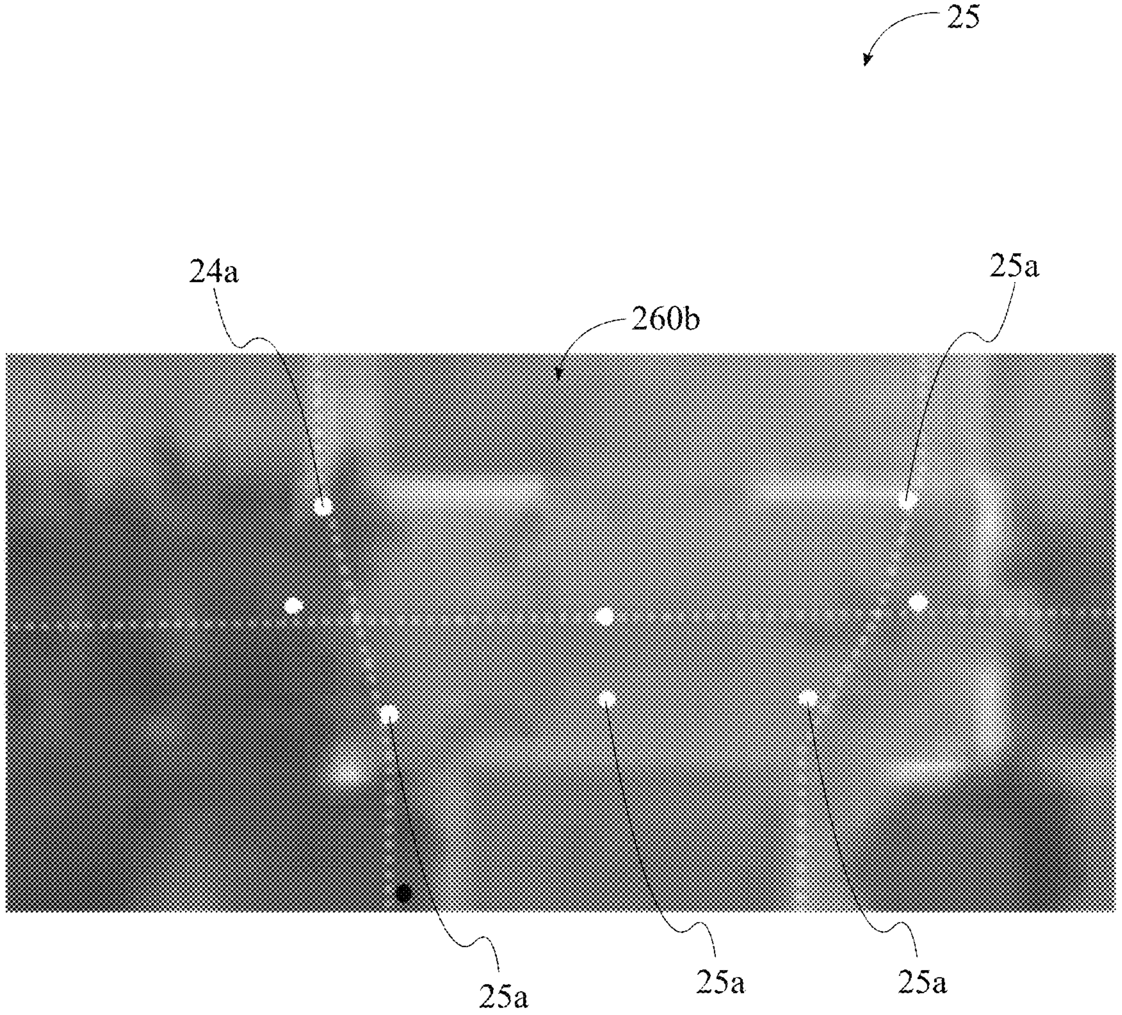
FIG. 6 is a picture of a square having a first node and a plurality of subsequent nodes plotted on the map interface of the present invention.
Figure 7:
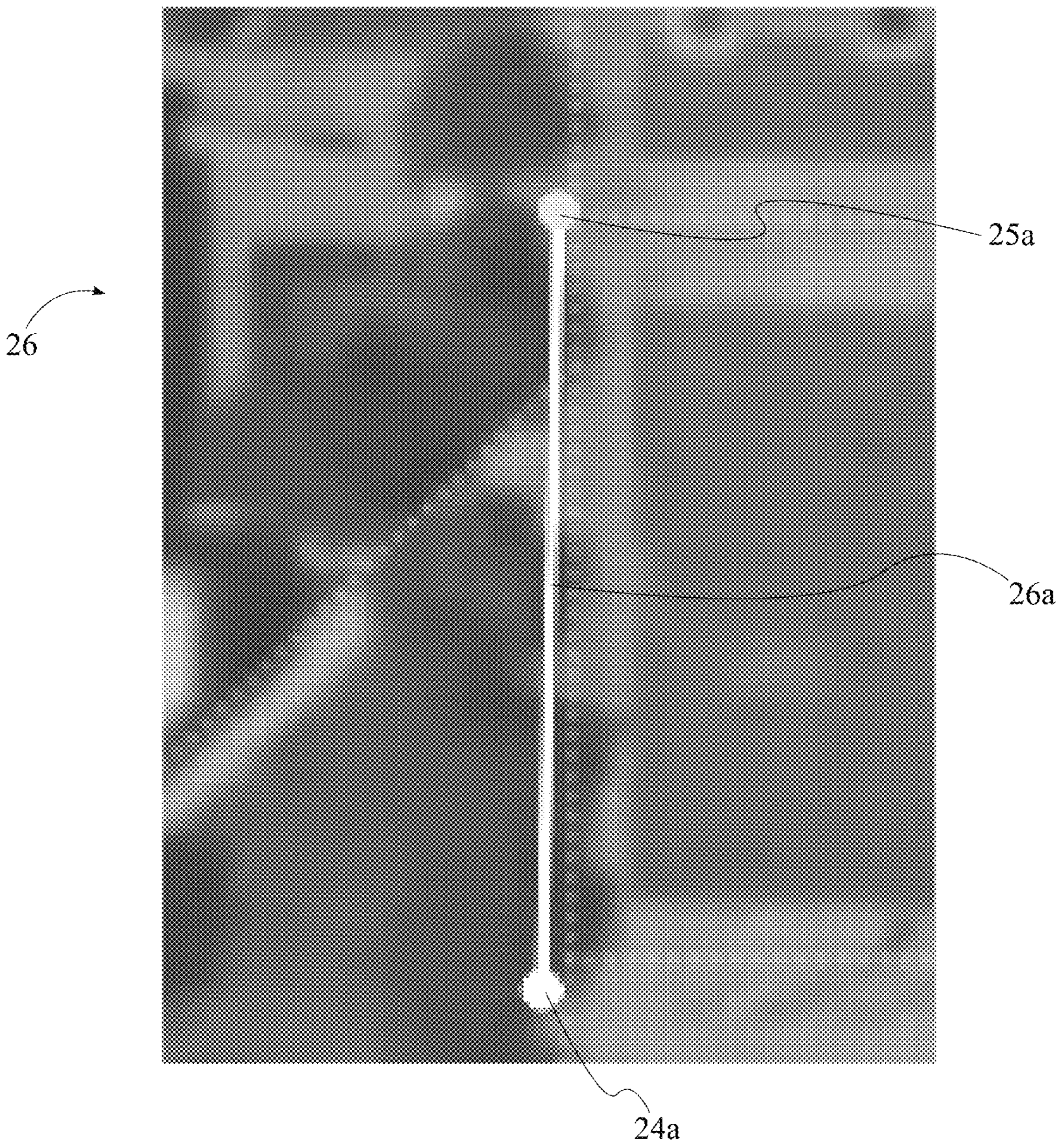
FIG. 7 is a picture of the first node and the subsequent second node connected via a way, plotted on a map interface of the present invention.
Figure 8:
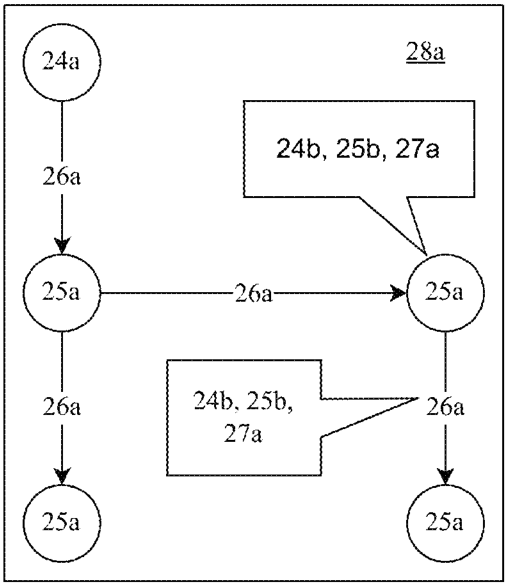
FIG. 8 is a diagram of a first node and a plurality of subsequent nodes, connected via a plurality of ways comprising a tag having collected data.
Figure 9:
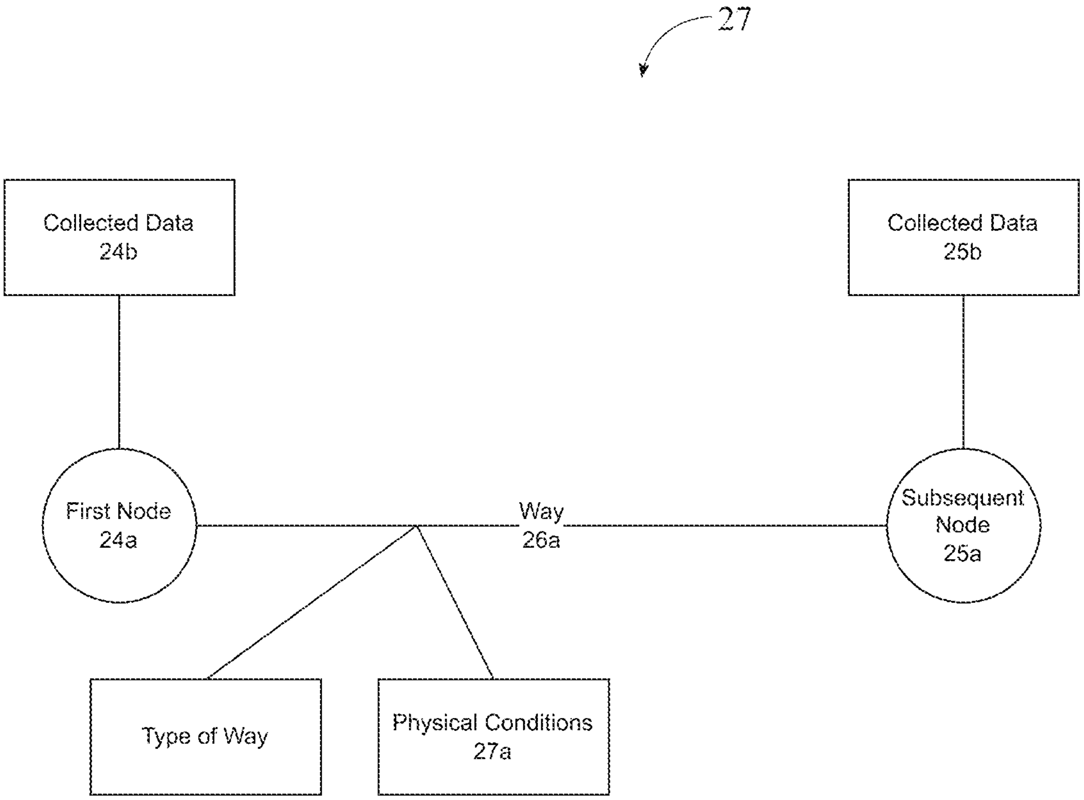
FIG. 9 is an alternate diagram of the first node and the second node, connected via a way having collected data tags including the type of way and the physical condition of the way.
Figure 10:
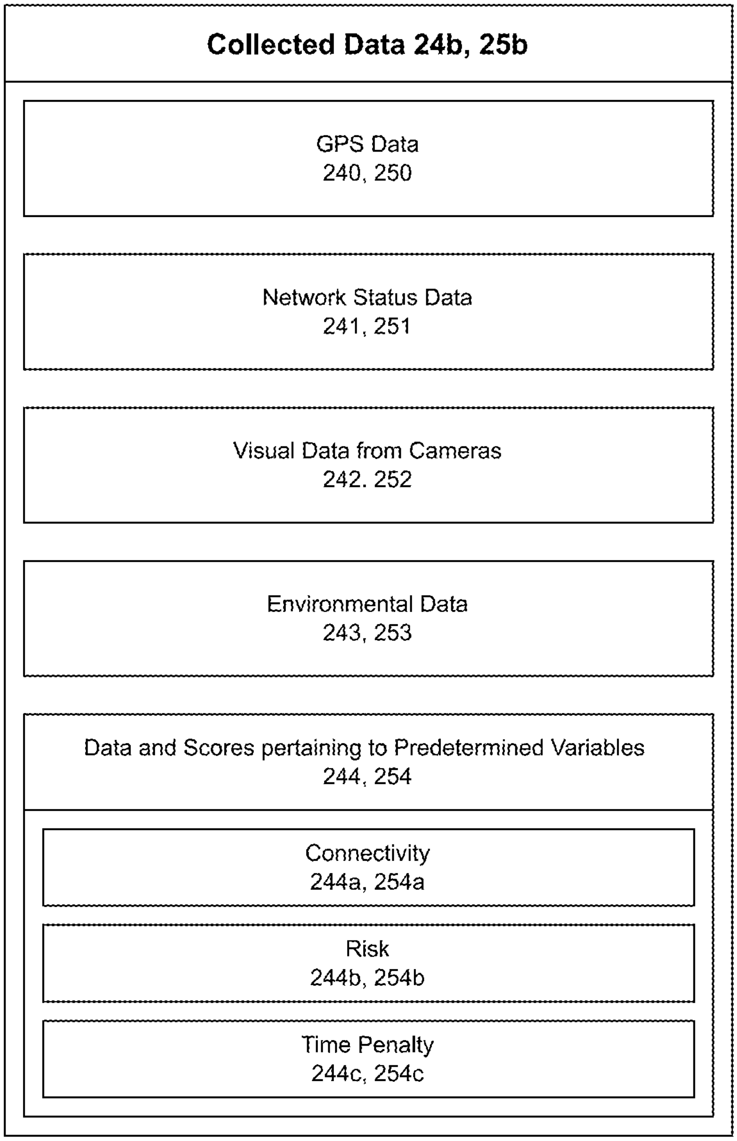
FIG. 10 is a chart of the collected data of the present invention.

While traversing 23 the predetermined path 22*a*, the data gathering module 10 records a first node 24*a* and a subsequent node 25*a*, while simultaneously recording 24, 25 a set of first node data 24*b* and a set of subsequent node data 25*b*, respectively. Additionally, once the data 24*b*, 25*b* has been collected, said data is communicated to the autonomy mapping tool software 110*a* wherein the first node 24*a* and the second node 25*a* are created, respectively. First, the data gathering module robot 10 records a first node 24*a*, as shown in FIG. 4. After recording the first node 24*a* and the respective first node data 24*b*, the data gathering module traverses a distance and records the subsequent node 25*a*, as shown in FIG. 5 and FIG. 6. In the context of the present invention, the first node 24*a* and the subsequent node 25*a* are two separate nodes, separated by a distance wherein the first node 24*a* is a data point taken prior to the subsequent node 25*a*. After traversing the distance separating the first node 24*a* and the subsequent node 25*a*, the autonomy mapping tool software 110*a* generates 26 a pathway, referred herein as a way 26*a*, wherein said way 26*a* connects the first node 24*a* and the subsequent node 25*a*, as shown in FIG. 7. Upon traversing the way 26*a*, the data gathering module robot 10 records 27 data pertaining to the way 26*a* comprising of a type 260 and an at least one physical condition 27*a*, as shown in FIG. 8 and FIG. 9. The collected node data 24*b*, 25*b* of both the first node 24*a* and the subsequent node 25*a*, in the preferred embodiment of the present invention, as shown in FIG. 10, comprises at least one of GPS data 240, network status data 241, visual data from an at least one camera 101 contained on the data gathering module 242, environmental data 243, data and scored pertaining to predetermined variables 244 wherein said variables comprise connectivity 244*a*, risk 244*b*, and time 244*c*, and a combination thereof. Risk 244*b* is a determination of the mobile robot traversing the way 26*a* safely. Time 244*c*, is a determination of the travel time to traverse the way 26*a*. The key objective of the present invention is to minimize risk of a robot traversing a route and thus, it is crucial in the preferred embodiment of the present invention, that the variables such as connectivity 244*a*, risk 244*b*, and time 244*c*, are computed and used in a navigational analysis. Furthermore, connectivity 244*a*, is a necessary variable to measure in the event that an operator is required to navigate a mobile robot, using the present invention.

Figure 11:
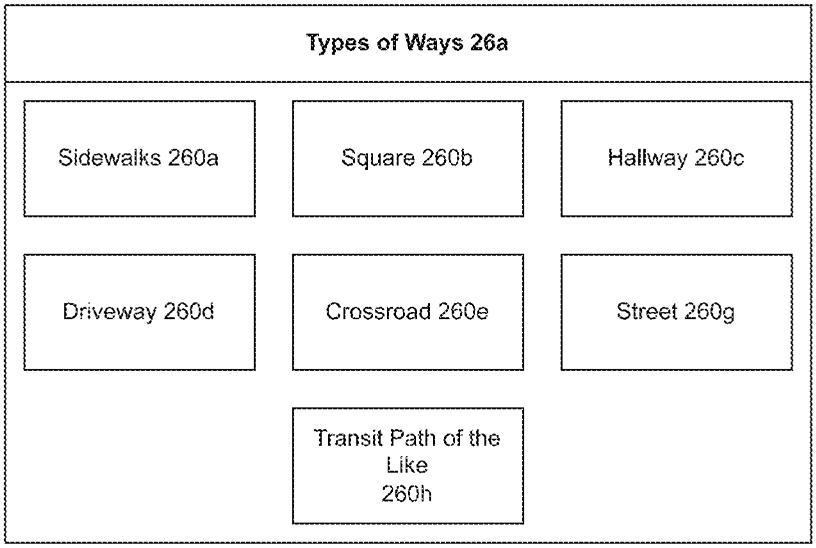
FIG. 11 is a chart of the types of ways of the present invention.
Figure 12:
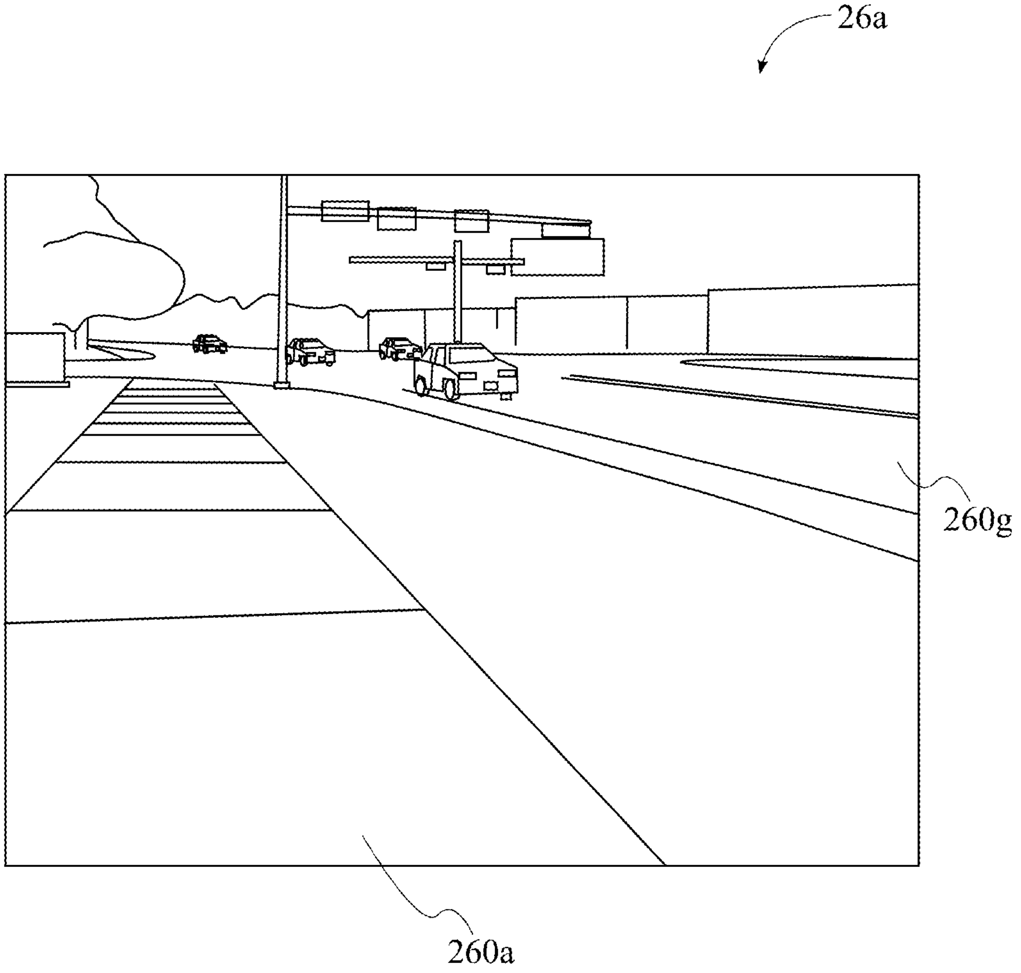
FIG. 12 is a drawing of a sidewalk and a street composing types of way of the present invention.
Figure 13:
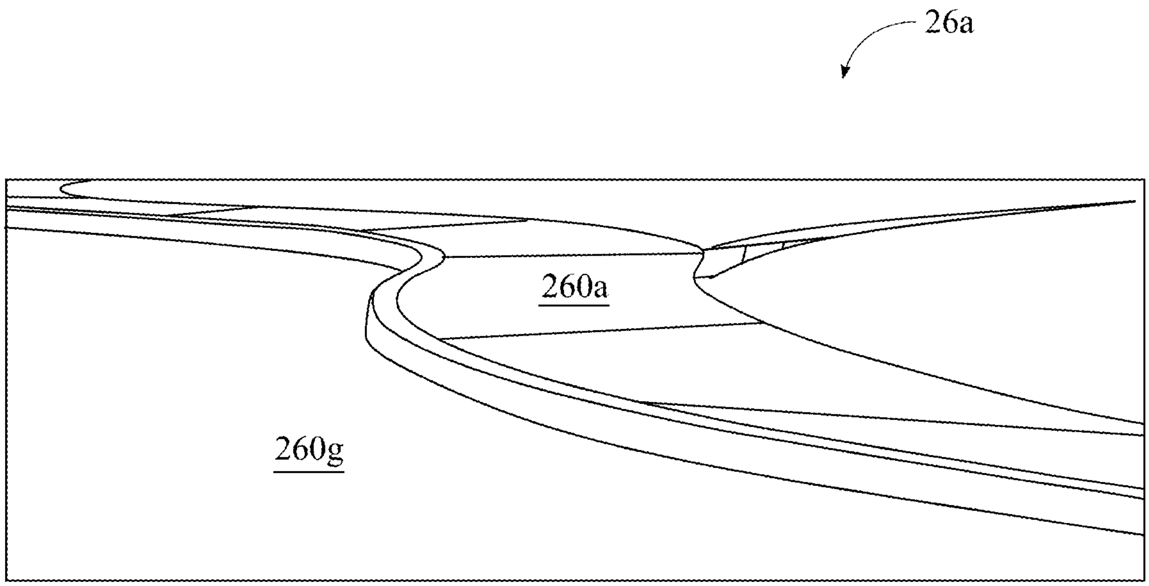
FIG. 13 is an alternate drawing of a sidewalk and a street composing types of way of the present invention.
Figure 14:
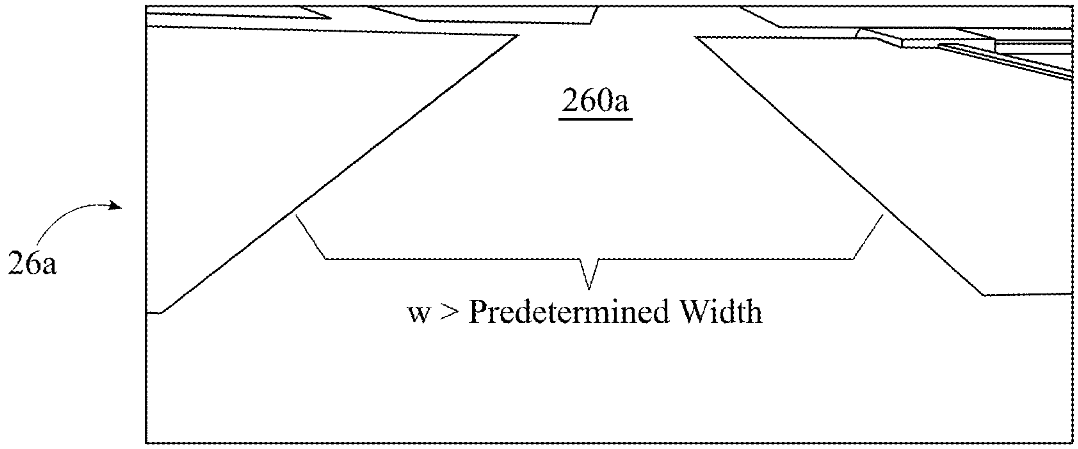
FIG. 14 is an alternate drawing of a sidewalk composing a type of way of the present invention.
Figure 15:
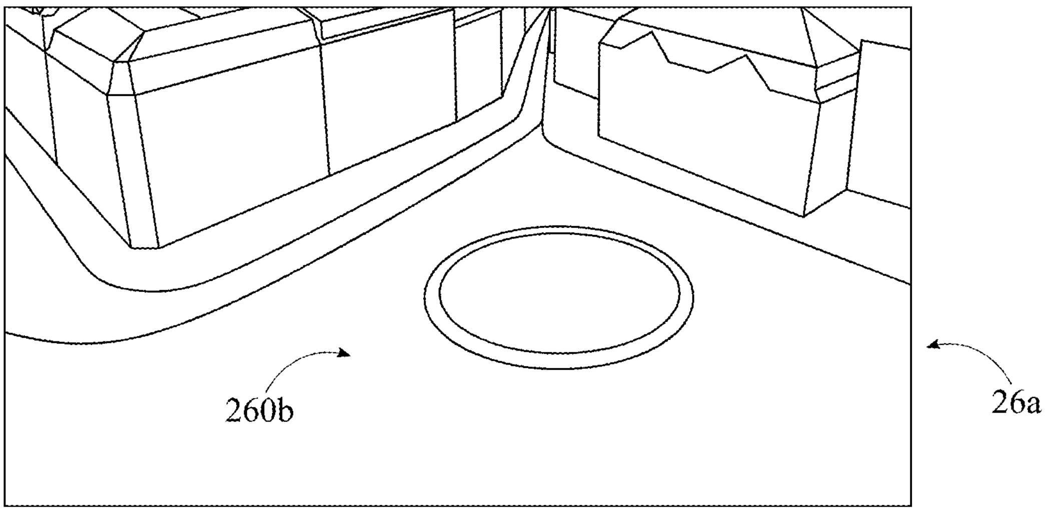
FIG. 15 is a drawing of a square as a type of way of the present invention.
Figure 16:
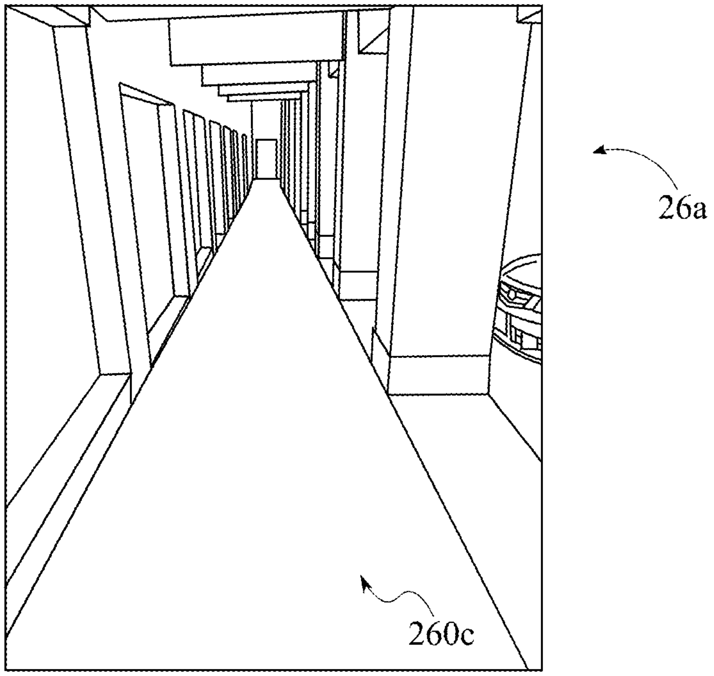
FIG. 16 is a drawing of a hallway as a type of way of the present invention.
Figure 17:
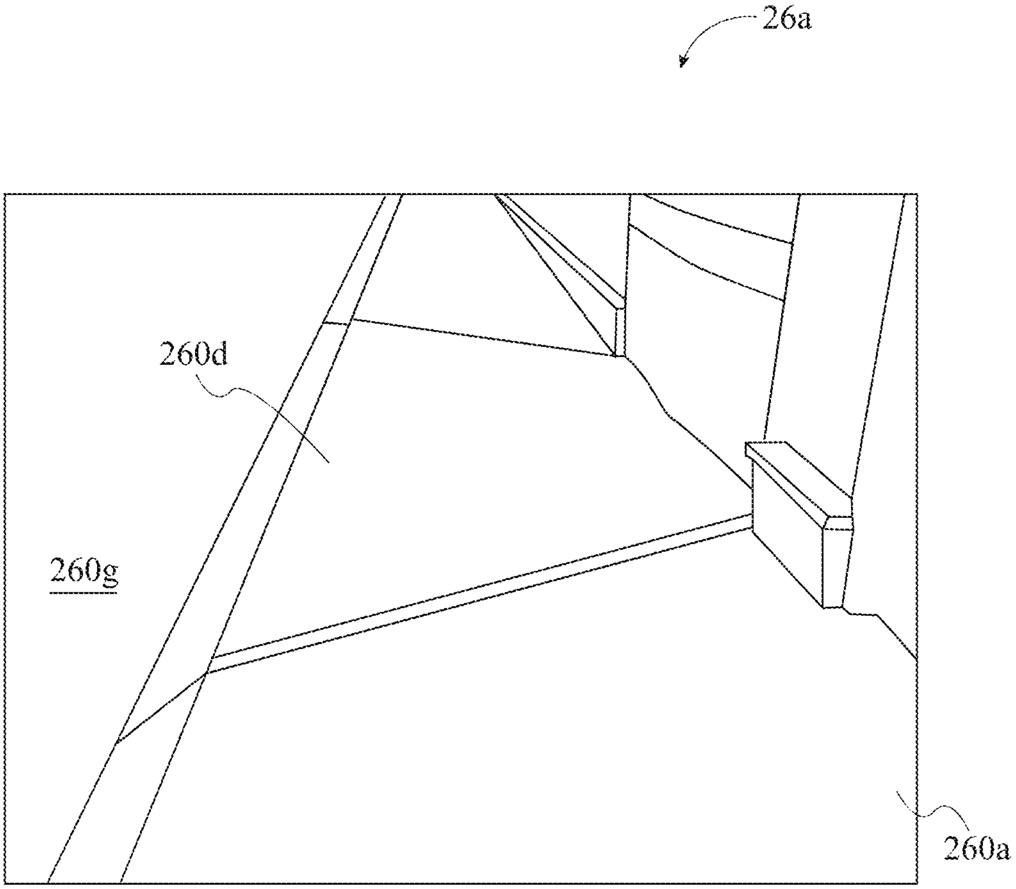
FIG. 17 is a drawing of a residential driveway as a type of way of the present invention.
Figure 18:
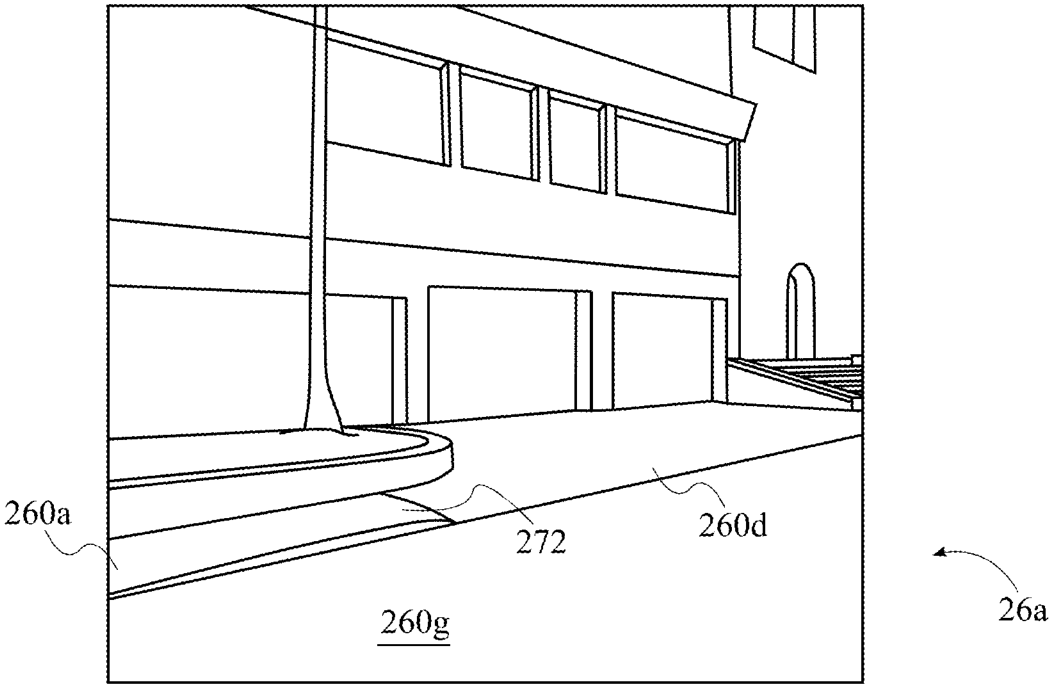
FIG. 18 is an alternate drawing of a residential driveway as a type of way of the present invention.
Figure 19:
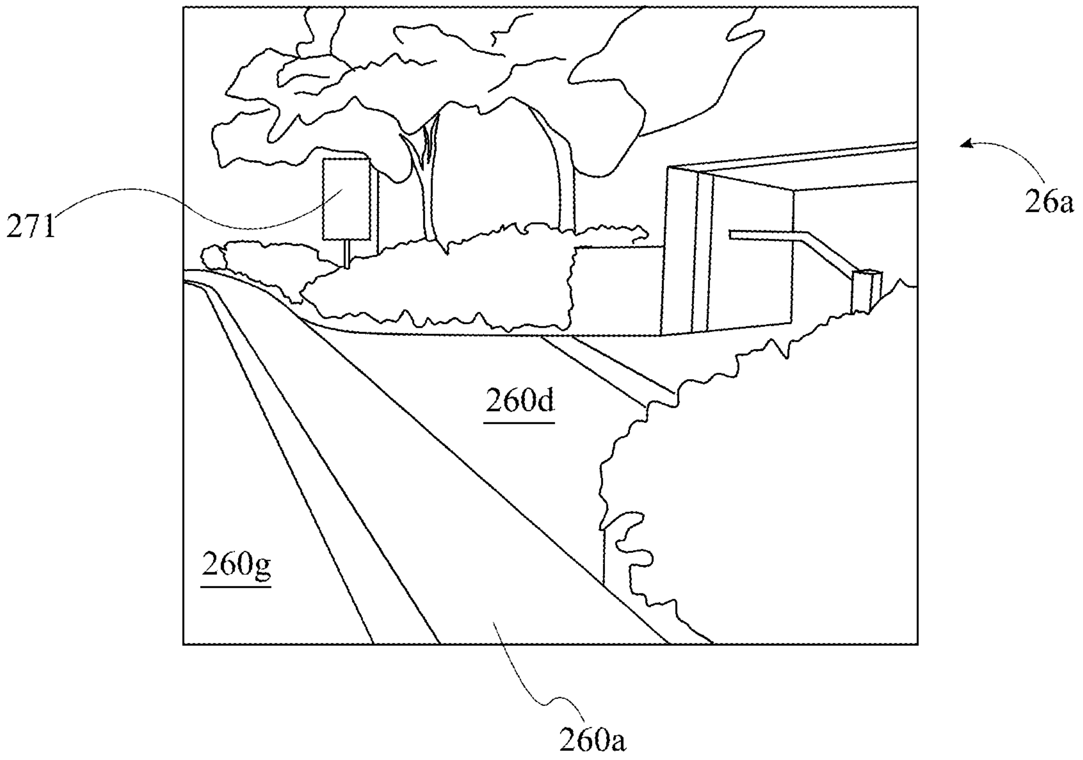
FIG. 19 is a drawing of a commercial driveway as a type of way of the present invention.
Figure 20:
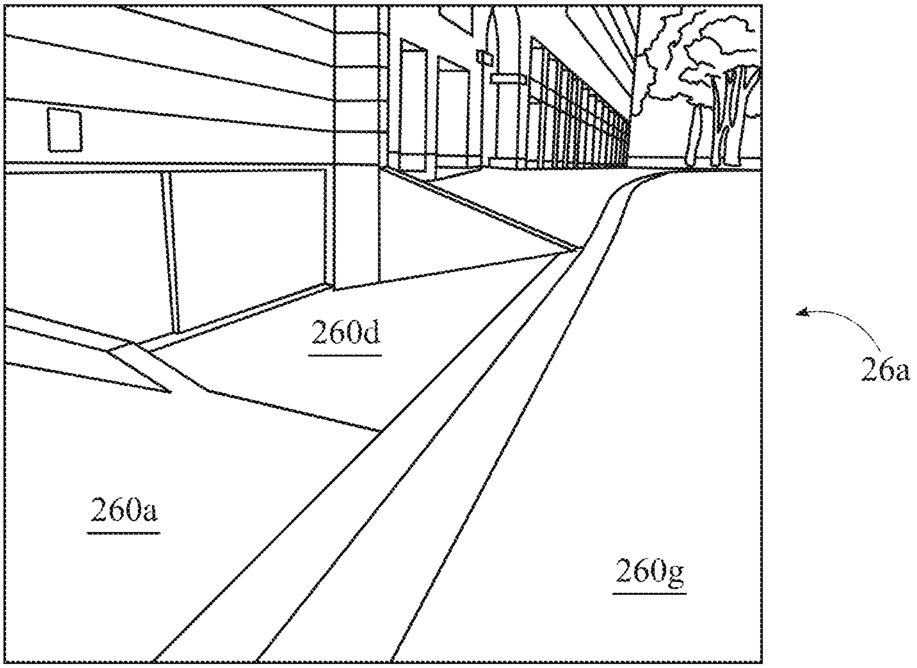
FIG. 20 is a drawing of an industrial driveway as a type of way of the present invention.
Figure 21:
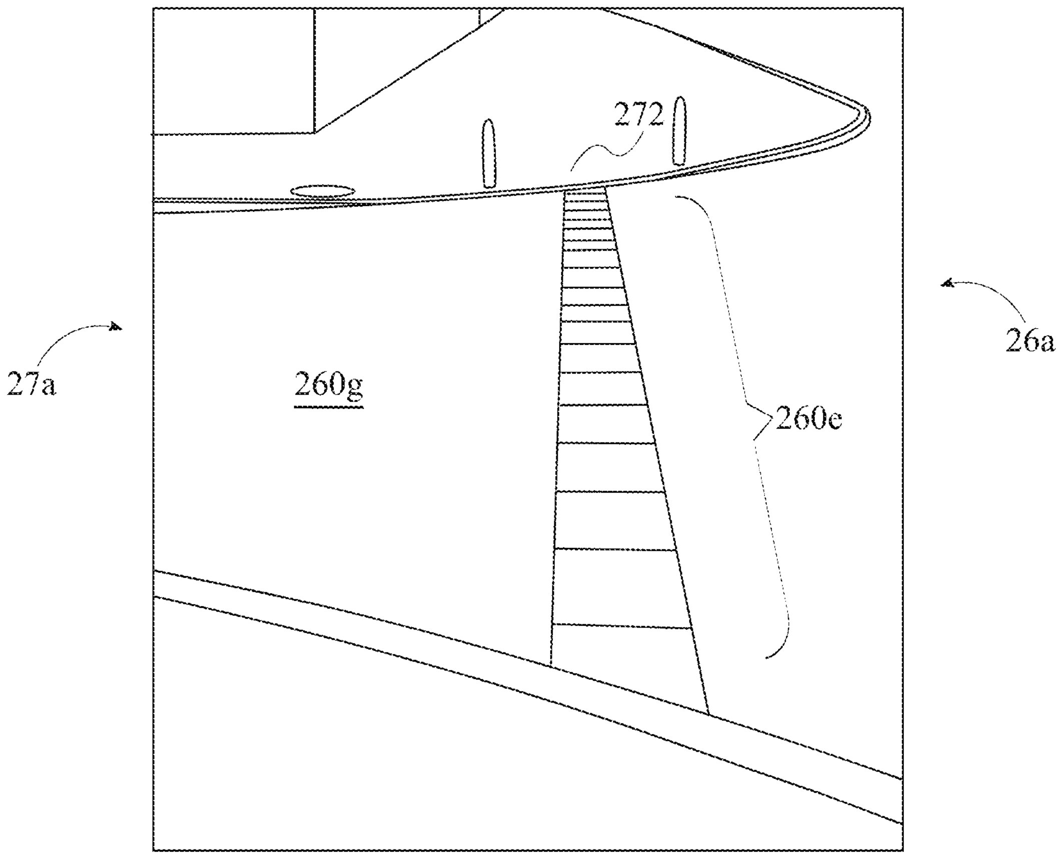
FIG. 21 is a drawing of a crosswalk as a type of way of the present invention.

In the context of the present invention, as shown in FIG. 11, the types 260 of ways 26*a* may be categorized as at least one of the following comprising of: a sidewalk 260*a*, a square 260*b*, a hallway 260*c*, a driveway 260*d*, a crosswalk 260*e*, a street 260*g*, a traversable transit path of the like 260*h*, and combinations thereof. As shown in FIG. 12, FIG. 13, and FIG. 14, a sidewalk 260*a* is a solid path, typically paved for pedestrian traffic. Likewise, within the context of the present invention, a square 260*b* is an open public space, as shown in FIG. 15. In some cases, when traversing through a sidewalk 260*a* that is beyond a predetermined width (w>predetermined width), as shown in FIG. 14, the data gathering module robot 10, may record multiple nodes 24*a*, 25*a* along the same distance, as is preferred that the data gathering module robot 10 traverse along the outer edge of the sidewalk 260*a* as to not mistakenly categorize the sidewalk 260 as a square 260*b*. A hallway 260*c*, as shown in FIG. 16, within the context of the invention, may be defined as an indoor corridor, an outdoor corridor, or a combination primarily used for pedestrian traffic. In the context of the present invention, a driveway 260*d* may refer to residential driveway as shown in FIG. 17 and FIG. 18, a commercial driveway as shown in FIG. 19, an industrial driveway as shown in FIG. 20, and driveways of the like wherein said driveways are paths leading from a street to an area or building located off of the street, primarily used by vehicles. Lastly, a crosswalk 260*e*, also referred herein as a crossroad 260*e*, is a pedestrian crossing designated path traversing a street 260*g*, as shown in FIG. 21.

Figure 22:
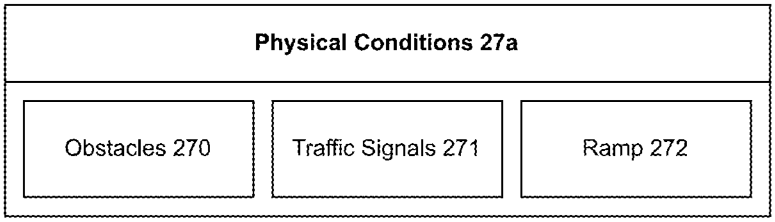
FIG. 22 is a chart of the physical conditions of the present invention.
Figure 23:
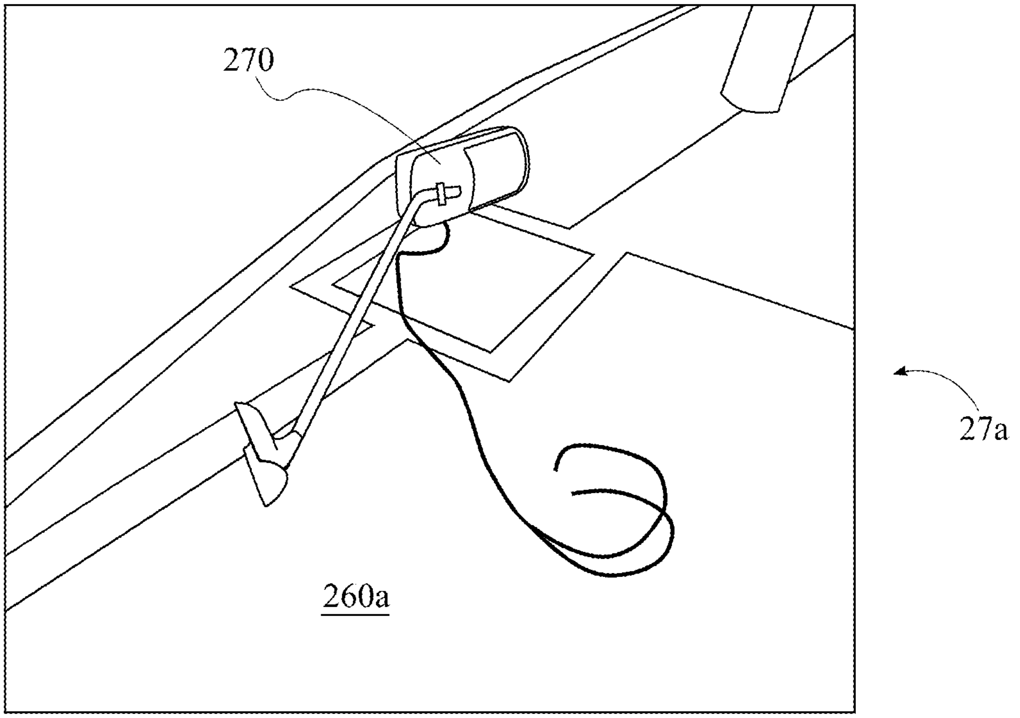
FIG. 23 is a drawing of an obstacle as a physical condition of the present invention.
Figure 24:
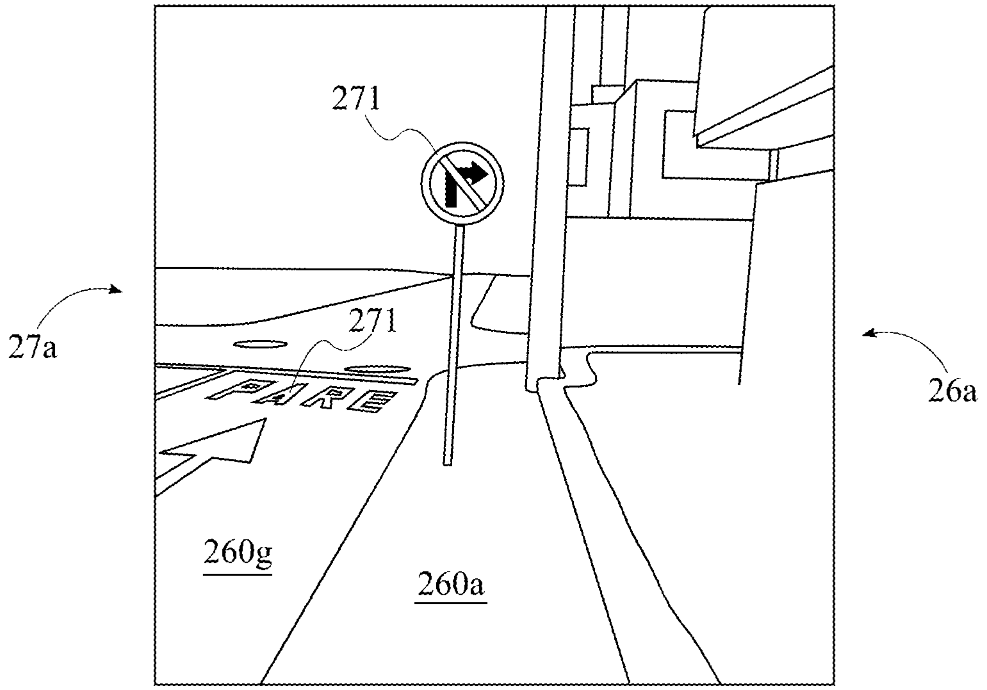
FIG. 24 is a drawing of a traffic signal as a physical condition of the present invention.
Figure 25:
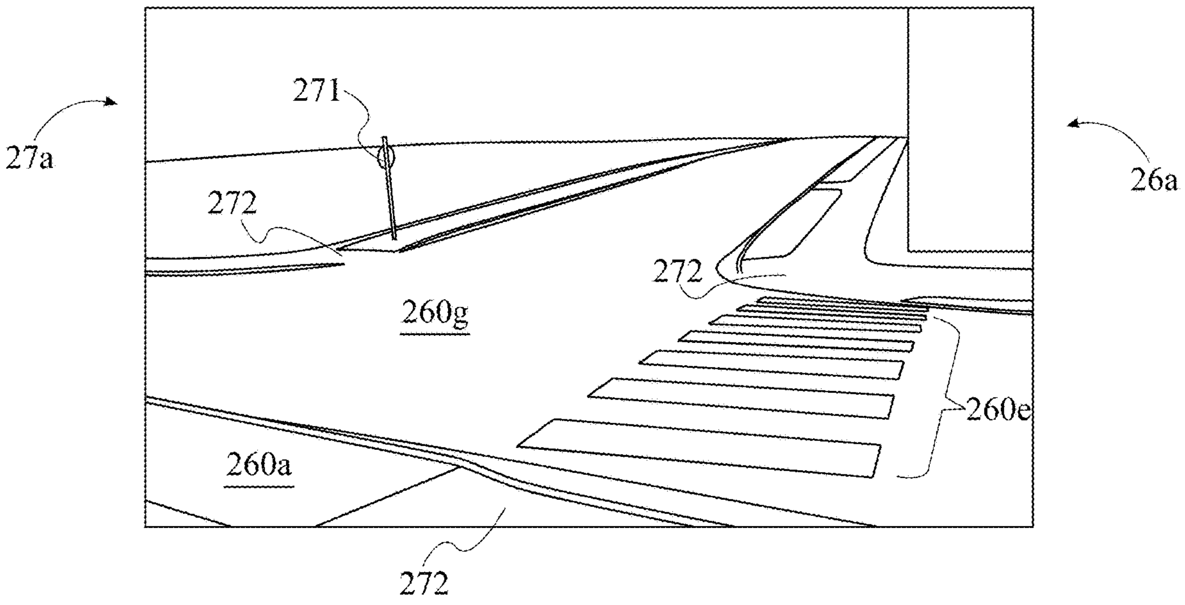
FIG. 25 is a drawing of a ramp as a physical condition of the present invention.

Within the context of the present invention, a physical condition 27*a*, as shown in FIG. 22, may comprise an obstacle 270, as shown in FIG. 23; a traffic signal 271, as shown in FIG. 24; a ramp 272, as shown in FIG. 25; and conditions of the like pertaining to the ability of a mobile robot to traverse a given way.

Figure 26:
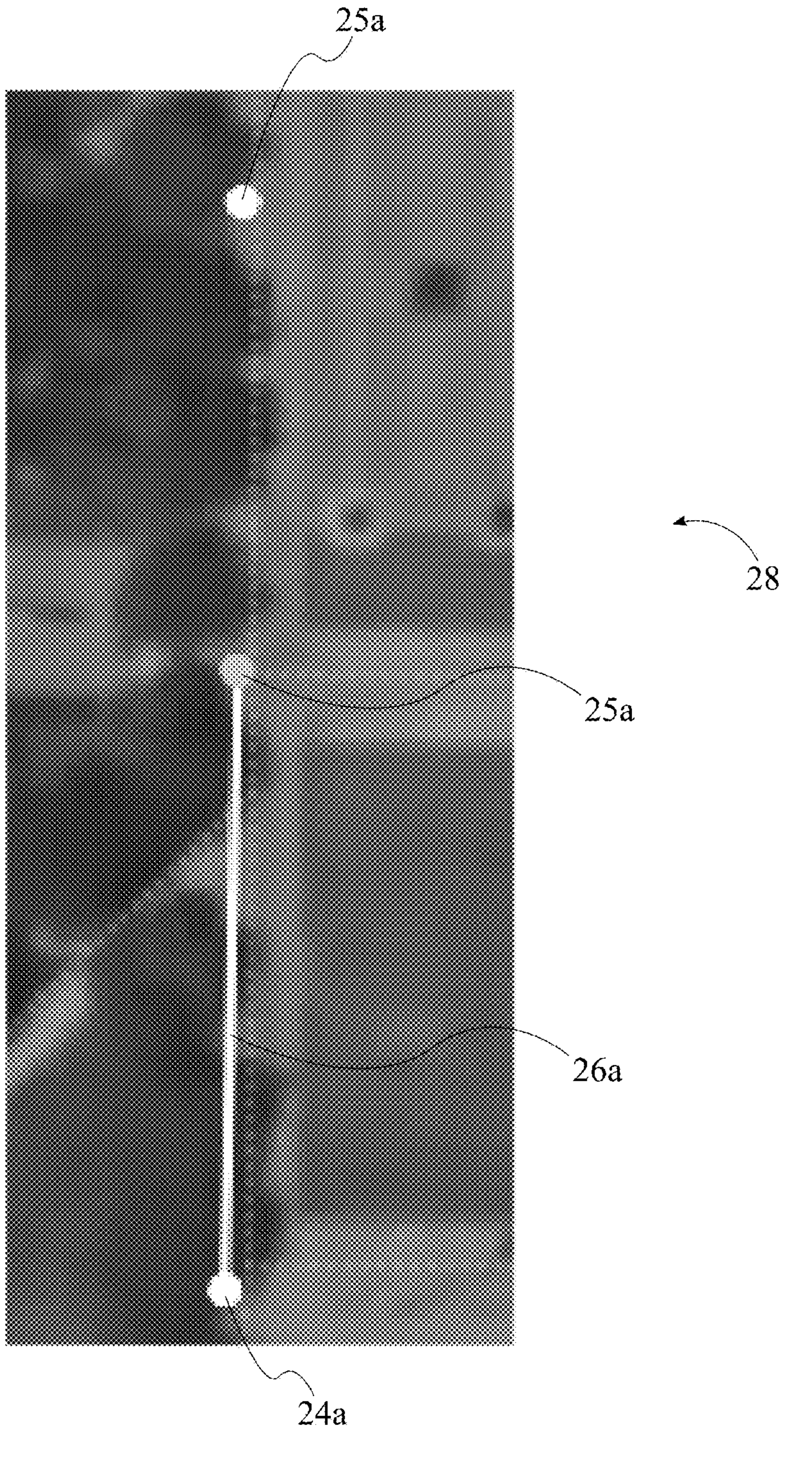
FIG. 26 is a picture of the iterative process of placing a subsequent node, plotted on a map interface of the present invention.
Figure 27:
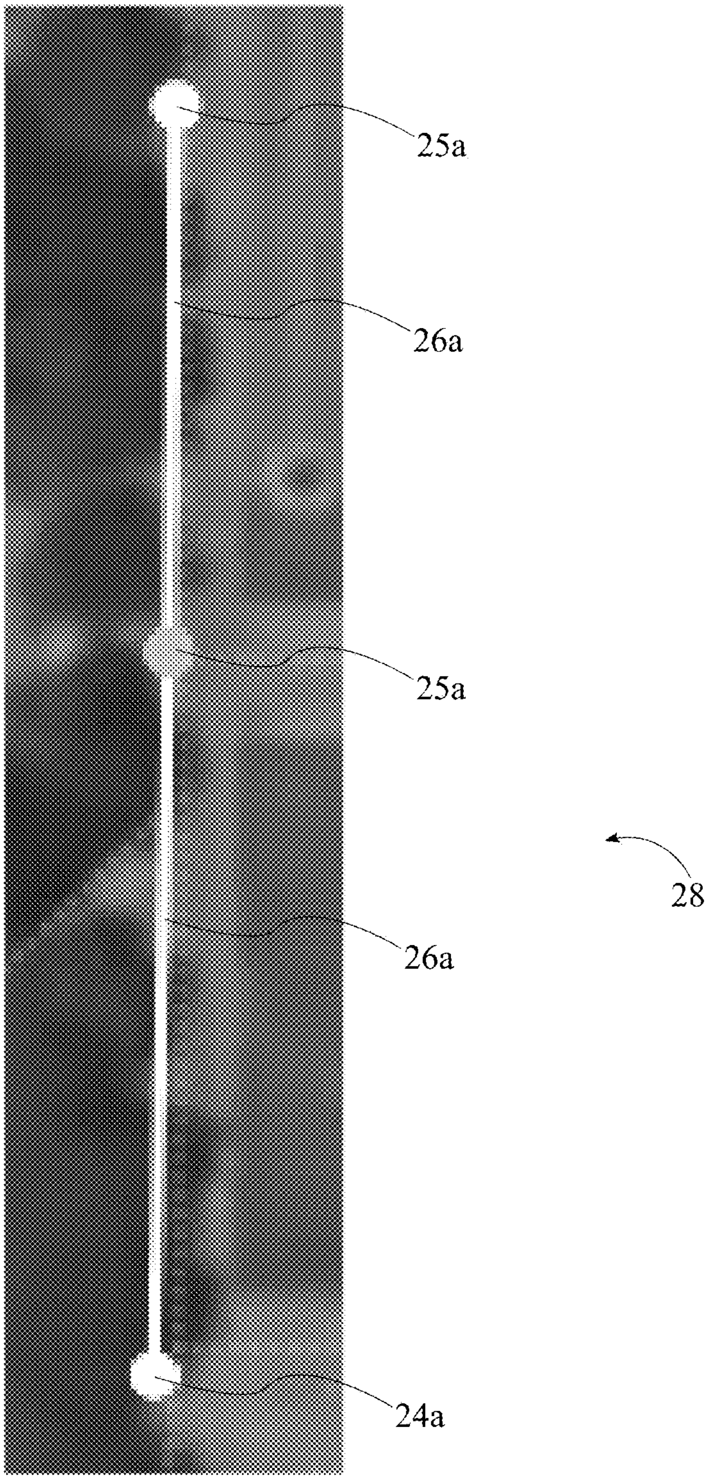
FIG. 27 is a picture of the iterative process of connecting a way between subsequent nodes, plotted on a map interface of the present invention.
Figure 28:
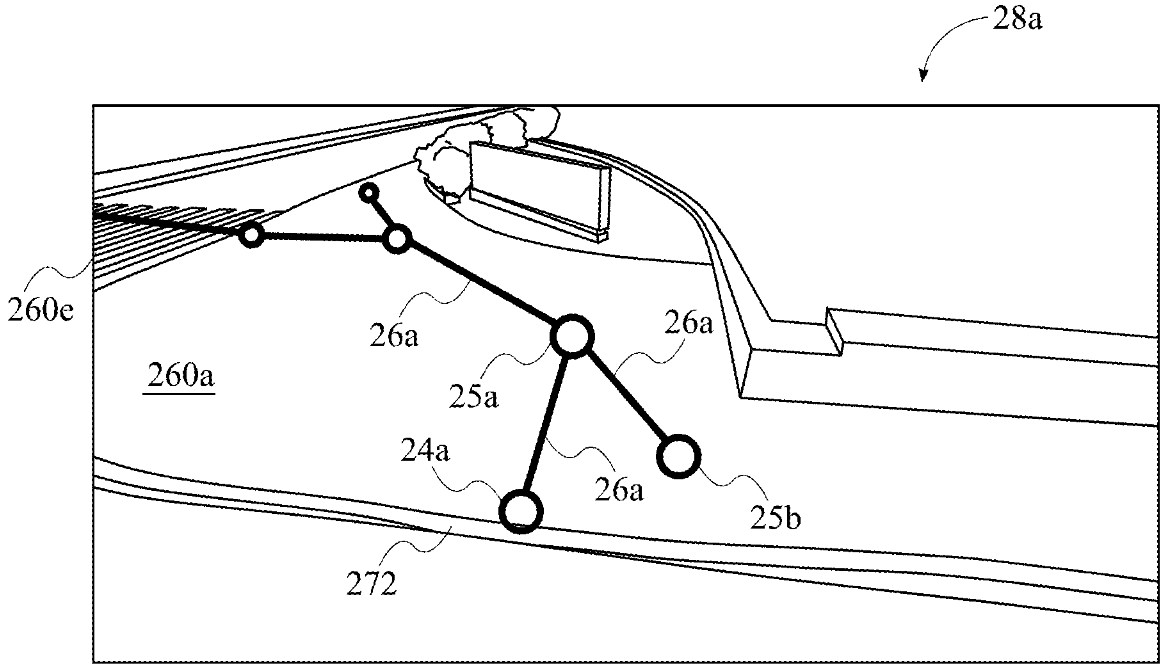
FIG. 28 is a drawing of a plurality of nodes and ways plotted on a street view map interface of the present invention.
Figure 29:
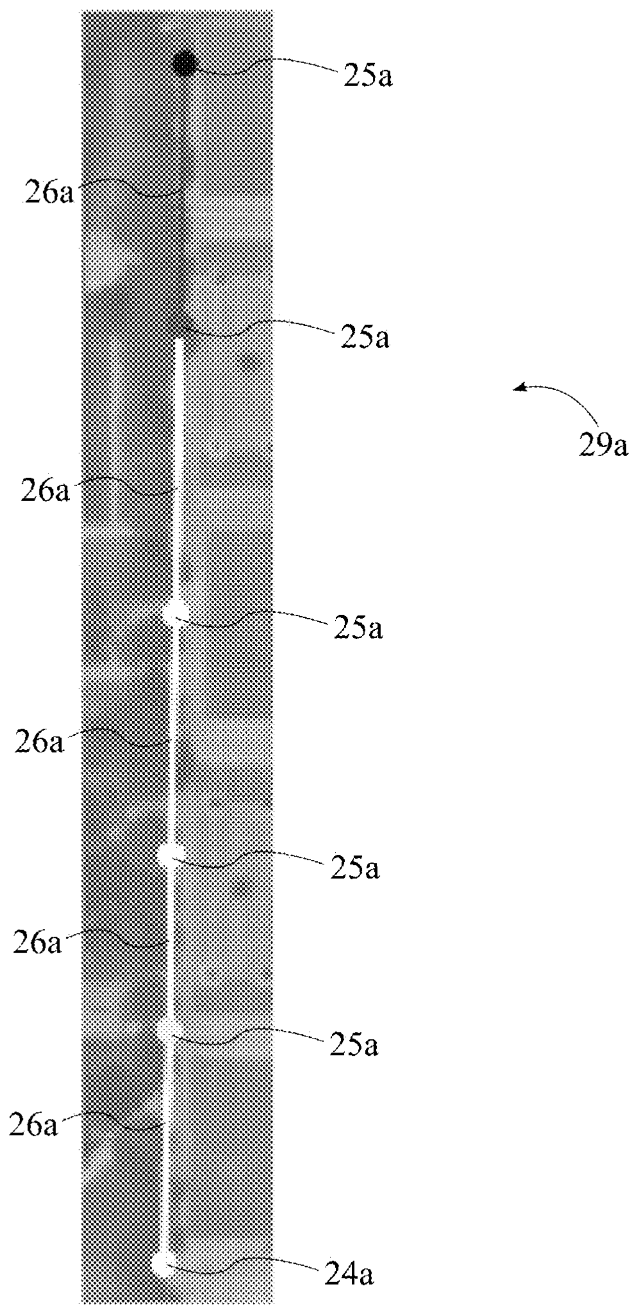
FIG. 29 is a picture of a route, composed of a plurality of nodes and ways, plotted on a map interface of the present invention.
Figure 30:
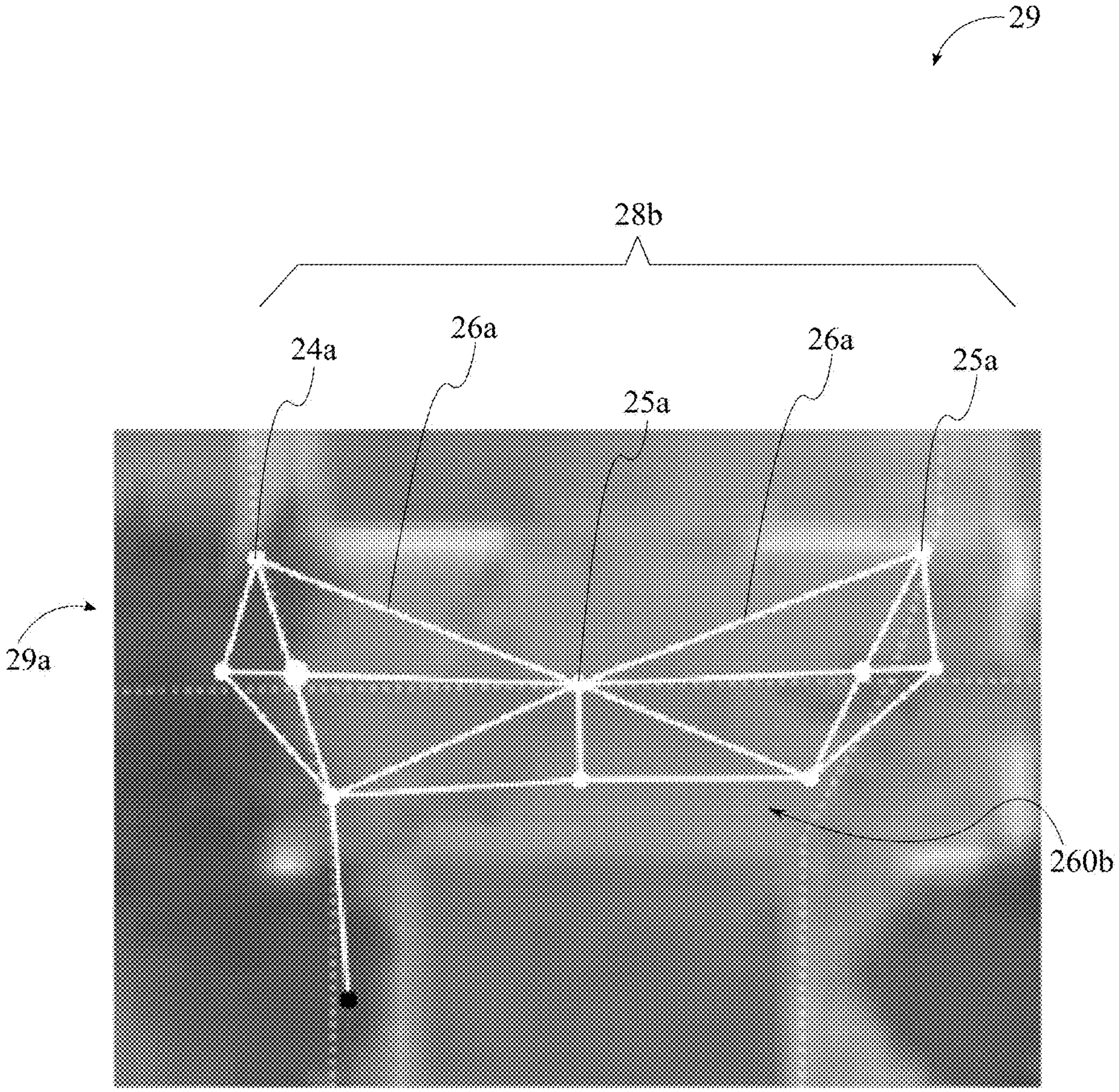
FIG. 30 is a picture of a comprehensive map of a square composed of a plurality of nodes and ways, plotted on a map interface of the present invention.
Figure 31:
FIG. 31 is a picture of a comprehensive map, composed of a plurality of nodes and ways, plotted on a map interface of the present invention.

As shown in FIGS. 26-28, once the first node 24*a*, the subsequent node 25*a*, and the respective way 26*a* have been recorded 28*a*, along with the respective collected node data 24*b*, 25*b* and way data 27*a*, the method 28*a* iterates, whereby the iterated steps comprise: recording 24 a first node 24*a* while simultaneously collecting node data 24*b* pertaining to said first node 24*a*, recording a subsequent node 25*a* while simultaneously collecting node data 25*b* pertaining to said subsequent node 25*a*, generating 26 a way 26*a*, and collecting 27 and recording physical condition 27*a* data pertaining to the way 26*a* between the first node 24*a* and subsequent node 25*a*. In the iterated process 28, the subsequent node 25*a* of the first iteration is treated as the first node of the subsequent iteration, and the subsequent node of the subsequent iteration becoming the subsequent node 25*a* whereby a subsequent way 26*a* is the pathway between the subsequent node 25*a* of the first iteration and the subsequent node 25*a* of the subsequent iteration. The iteration occurs 28 until the data gathering module records all possible nodes 28*b* and ways of the target area, thus composing 29 a comprehensive map 29*a*, as shown in FIGS. 29-31. The comprehensive map is the collection of all possible nodes and ways 34*a*.

Figure 32:
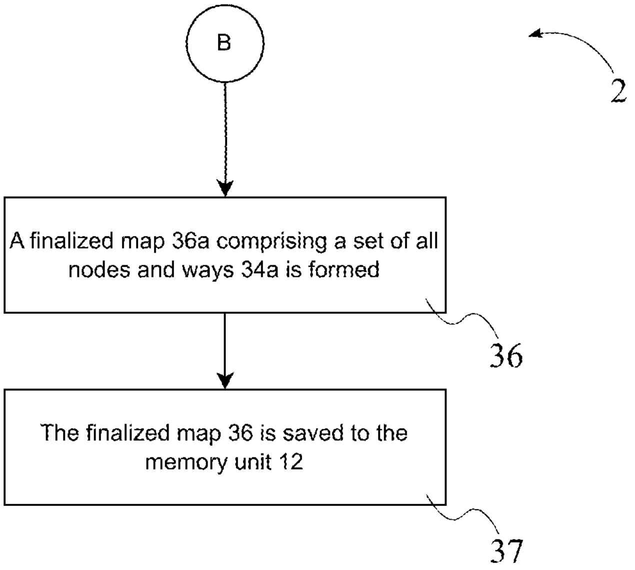
FIG. 32 is a process diagram of the present invention, continuing from FIG. 3.
Figure 33:
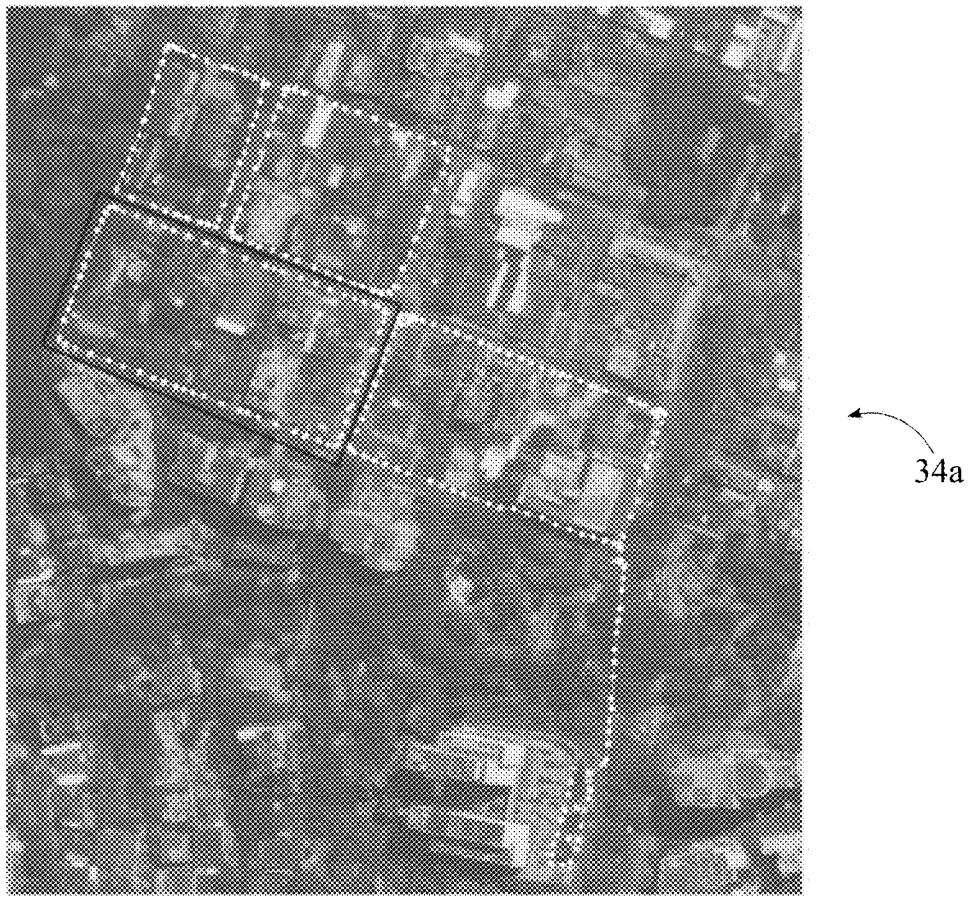
FIG. 33 is a picture of a finalized map, comprising a plurality of nodes and ways, plotted on a map interface.
Figure 34:
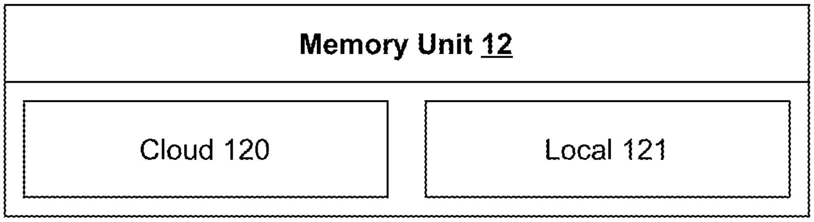
FIG. 34 is a chart listing the memory units of the present invention.

Once the comprehensive map is generated 29, the weights modeling software 110*b* analyzes 30 and processes the comprehensive map, generating 31 a weighted score representative of the effectiveness of the nodes 24*a*, 25*a* and ways 26*a* recorded. The weighted score is a weighted calculation of the collected node data 24*b*, 25*b*, way type 260, and physical condition of the ways 27*a*. After a weighted score is calculated 31, the ways 26*a* and collected node data 24*b*, 25*b* are converted 32 into a machine-readable format. As shown in FIG. 32, after conversion 32 of the collected node data 24*b*, 25*b* into a machine-readable format, the present invention generates a finalized map 36*a*, wherein said finalized map 36*a*, is a collection of all nodes and ways 34*a*, and the weighted scores for each of the of the nodes 24*a* and ways 25*a*. as shown in FIG. 33. The finalized map 36*a* is then stored 37 onto a memory unit 12, as shown in FIG. 34. In some embodiments of the present invention, the memory unit 12 is a cloud network storage system 120. In alternate embodiments of the present invention, the memory unit 12 is a local storage unit 121.

Although the invention has been explained in relation to its preferred embodiment, it is to be understood that many other possible modifications and variations can be made without departing from the spirit and scope of the invention.

What is claimed is:

1. A method of mapping and routing robotically navigable pathways and routes comprising the steps:

planning a designated route for a data gathering module robot to commute;

navigating the data gathering module robot along the designated route;

recording a first node while simultaneously collecting node data pertaining to said first node;

recording a subsequent node while simultaneously collecting node data pertaining to said subsequent node; and generating a pathway connecting the first node to the subsequent node;

collecting and recording physical condition data pertaining to the pathway between the first and subsequent node;

iterating, until all possible nodes and pathways are collected, the steps, the collection of all possible nodes and ways composing a comprehensive map;

the data gathering module robot is a controllable mobile robot comprising a processing unit and a transmitting unit; and the data gathering module robot being capable of executing computer executable methods and software wherein said software comprises a geographical mapping tool software and an algorithmic weighting tool;

wherein the algorithmic weighting tool analyzes and processes the comprehensive map and generates a weighted score.

2. The method of mapping and routing robotically navigable pathways and routes, as claimed in claim 1, wherein the weighted score is calculated given the collected node data comprising:

geolocation data;

network status data;

visual data collected from at least one camera contained within the data gather module robot;

environmental data; and weighted scores utilizing the variables comprising:

connectivity;

risk; and time.

3. The method of mapping and routing robotically navigable pathways and routes, as claimed in claim 2, wherein the collected node data is converted into a machine-readable format.

4. The method of mapping and routing robotically navigable pathways and routes, as claimed in claim 3, wherein each of the ways and nodes of the comprehensive map are given a weighted score to minimize the risk of a mobile robot.

5. The method of mapping and routing robotically navigable pathways and routes, as claimed in claim 4, further comprising the steps:

generating a finalized map composed of the sum of all possible nodes and ways, node data, and way data gathered by the data gathering module.

6. The method of mapping and routing robotically navigable pathways and routes, as claimed in claim 5, wherein the finalized map is saved onto a memory unit.

7. The method of mapping and routing robotically navigable pathways and routes, as claimed in claim 6, wherein the memory unit is a cloud storage system.

8. The method of mapping and routing robotically navigable pathways and routes, as claimed in claim 6, wherein the memory unit is a local storage system.

9. The method of mapping and routing robotically navigable pathways and routes, as claimed in claim 1, wherein the data gathering module robot comprises at least one hardware comprising:

a front camera;

rear camera;

an internal camera;

a side camera;

a geolocation device wherein said geolocation device is selected from a global positioning system device (GPS), a real-time kinematic device (RTK), and a combination thereof;

a GPS equipped camera box; and a plurality of specialized weather sensors comprising:

a temperature sensor;

a humidity sensor; and an air quality sensor;

said at least one hardware being contained on the data gathering module robot.

10. The method of mapping and routing robotically navigable pathways and routes, as claimed in claim 1, wherein the data gathering module robot is connected to a system wirelessly via the transmitting unit, wherein said system wirelessly communicates instructions via the geographical mapping tool software.

11. The method of mapping and routing robotically navigable pathways and routes, as claimed in claim 1, wherein the ways being recorded as consisting of at least one of the following including:

a sidewalk;

a square;

a hallway;

a driveway;

a crosswalk;

a street; and a traversable path of the like; and the physical condition data comprising information pertinent to the way comprising information relevant to obstacles, traffic signals, and ramps.

12. A method of mapping and routing robotically navigable pathways and routes comprising the steps:

deploying a data gathering module robot into a designated location;

connecting the data gathering module robot to a system comprising a geographical mapping software and an algorithmic weighting tool;

planning a designated route for the data gathering module robot to commute via the geographical mapping tool software;

navigating the data gathering module robot along the designated route;

recording a first node while simultaneously collecting node data pertaining to said first node;

recording a subsequent node while simultaneously collecting node data pertaining to said subsequent node; and generating a pathway connecting the first node to the subsequent node;

collecting and recording physical condition data pertaining to the way between the first and subsequent node;

iterating, until all possible nodes and ways are collected, the steps; and further comprising steps of:

collecting and recording physical condition data pertaining to the pathway between the first and subsequent node wherein the subsequent node of the first iteration acting as the first node of the subsequent iteration, and the subsequent node of the subsequent iteration becoming the subsequent node whereby a subsequent pathway is the pathway between the subsequent node of the first iteration and the subsequent node of the subsequent iteration;

generating a comprehensive map composed of all possible nodes and ways;

analyzing and processing the comprehensive map via the algorithmic weighting tool;

generating an at least one weighted score pertaining to the comprehensive map; and storing a finalized map onto a cloud storage system, wherein the finalized map is the sum of all nodes, ways, collected node data, collected pathway data, and the weighted score;

wherein the data gathering module robot is a controllable mobile robot comprising:

a processing unit;

a transmitting unit;

a front camera;

a rear camera;

an internal camera;

a side camera;

a geolocation device wherein said geolocation device is selected from a global positioning system device (GPS), a real-time kinematic device (RTK), and a combination thereof;

a GPS equipped camera box; and a plurality of specialized weather sensors comprising:

a temperature sensor;

a humidity sensor; and an air quality sensor; and the data gathering module robot being capable of executing computer executable methods via the processing unit.

* * * * *